(12) United States Patent
De Groote et al.

(10) Patent No.: US 6,570,886 B1
(45) Date of Patent: May 27, 2003

(54) TIME SLOT MANAGEMENT METHOD AND A MAIN STATION AND SUBSTATION REALIZING SUCH A METHOD

(75) Inventors: Jan Lieven Bert De Groote, Berchem (BE); Ingrid Zulma Benoit Van De Voorde, Wilrijk (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/100,486

(22) Filed: Jun. 19, 1998

(30) Foreign Application Priority Data

Jun. 19, 1997 (EP) .............................. 97401422

(51) Int. Cl.[7] .............................. H04B 7/212; H04J 3/00
(52) U.S. Cl. ....................................... 370/442; 370/337
(58) Field of Search ................................ 370/321, 337, 370/347, 395, 442, 443, 468, 471

(56) References Cited

U.S. PATENT DOCUMENTS

| | | | | |
|---|---|---|---|---|
| 5,353,285 A | * | 10/1994 | Van Der Plas et al. | 370/84 |
| 5,398,129 A | | 3/1995 | Reimann | |
| 5,570,355 A | * | 10/1996 | Dail et al. | 370/60.1 |
| 5,805,994 A | * | 9/1998 | Perreault et al. | 455/435 |
| 5,832,289 A | * | 11/1998 | Shaw et al. | 395/800.3 |
| 5,953,318 A | * | 9/1999 | Nattkemper et al. | 370/236 |
| 6,023,467 A | * | 2/2000 | Abdelhamid et al. | 370/395 |

FOREIGN PATENT DOCUMENTS

EP 0544975 6/1993

OTHER PUBLICATIONS

"A Novel Ranging Method for ATM Over PON Systems" by van Heijningen et al, 13th Annual Conf. European Fibre Optic Commun. & Networks, vol. 1,27–60 Jun. 1995 UK, pp. 150–153.

"ATM Over Passive Optical Networks: System Design & Demonstration" by Van der Plas et al Multimedia Services Proc. Nov. 1992, Boston, MA pp. 48–57.

(List continued on next page.)

*Primary Examiner*—Alpus H. Hsu
*Assistant Examiner*—Toan D. Nguyen
(74) *Attorney, Agent, or Firm*—Ware, Fressola, Van Der Sluys & Adolphson

(57) ABSTRACT

A time slot management method for use in a time division multiple access network. The time division multiple access network includes a main station (MS) coupled to each of a plurality of substations (S1, S2, S3, . . . , S15, S16) via the cascade connection of a common transmission link (Lc) and an individual user link (L1, L2, L3, . . . , L15, L16). The management method includes broadcasting substation identities (TEA1, TEA12, TEA16, TEA3, TEA7, . . . ) in downstream information packets from the main station (MS) to the plurality of substations (S1, S2, S3, . . . , S15, S16) to allow each one of the plurality of substations (S1, S2, S3, . . . , S15, S16) upon detection of its own substation identity to transfer a predetermined amount of upstream information packets in predetermined upstream timeslots to the main station (MS). The time slot management method additionally includes embedding at least part of the substation identities (TEA12, TEA3, TEA7, . . . ) in a physical layer operation and maintenance part. The physical layer operation and maintenance part is a predefined part of one of the downstream information packets broadcasted from the main station (MS) to the plurality of substations (S1, S2, S3, . . . , S15, S16) to transport operation and maintenance information packets related to operation and maintenance functions. Such a physical layer operation and maintenance part can be a physical layer operation and maintenance cell (PLOAM).

8 Claims, 2 Drawing Sheets

OTHER PUBLICATIONS

"Point to Multipoint Access Network Management" 1996 IEEE Network Operations & Mgmnt Symposium vol. 2, No. 5, Apr. 15, 1996, pp. 392–401.

"Asynchronous Transfer Mode: Solution for Broadband ISDN" Descp. of ATM by de Prycker, pp. 97–124, published 1991 by Ellis Horwood Limited, ISBN 0–13–053513–3.

ITU–T Recommendation 1.432 International Telecommunication Union, Integrated Services Digital Network (ISDN) (03/93. pp. 8–10.

ITU–T Recommendation 1.610 International Telecommunication Union, Integrated Services Digital Network (ISDN) (03/93. pp. 16–21.

* cited by examiner

TIME SLOT MANAGEMENT METHOD AND A MAIN STATION AND SUBSTATION REALIZING SUCH A METHOD

TECHNICAL FIELD

The present invention relates to a time slot management method for use in a time division multiple access network which includes a main station coupled to each of a plurality of substations via the cascade connection of a common transmission link and an individual user link, the management method including broadcasting substation identities in downstream information packets from the main station to the plurality of substations to allow each one of the plurality of substations upon detection of its own substation identity to transfer a predetermined amount of upstream information packets in predetermined upstream timeslots to the main station. The invention also relates to a main station and a substation realizing such a method.

BACKGROUND OF THE INVENTION

Such a time slot management method, main station and substation are already known in the art, e.g. from the published European patent application with publication number 0 544 975 A1. Therein, a time slot management system is described which includes a time division multiple access system with a main station connected to a plurality of substations by means of a tree like network. Substation identities are broadcasted in downstream information packets from the main station to the substations in order to thereby allow each one of the substations upon detection of its own substation identity to transfer upstream information in upstream information packets in predefined upstream timeslots. This time slot management system allocates the time slots in a flexible and dynamically way. The needed bandwidth to transmit upstream information is requested by the substations to the main station and the substations are informed by the main station of the allocated timeslots.

A feature of the described time slot management system is that the downstream information packets are including a predetermined number of blocks each of which include a header part and an information part. In order to reduce the overhead of the downstream information packets a first step is realized to distribute the stream of substation identities over the header parts of this predetermined number of blocks and a second step is realized to performe only one error check for this predetermined number of blocks and to distribute the error check information bits over the header parts of the predetermined number of blocks. In this way, the overhead of one information packet is a reduced number of bits.

It has to be remarked that in order to keep a maximum transfer capacity between the main station and the substations it is desirable to keep the number of bits of the overhead of the information packets as low as possible.

SUMMARY OF THE INVENTION

An object of the present invention is to provide a time slot management method of the above known type but wherein the overhead of one information packet is further reduced.

According to the invention, this object is achieved due to the fact that the time slot management method of the invention includes embedding at least part of the substation identities in a physical layer operation and maintenance part. Such a physical layer operation and maintenance part is a predefined part of one of the downstream information packets which is anyway broadcasted from the main station to the plurality of substations in order to transport operation and maintenance information packets related to operation and maintenance functions.

Indeed, by embedding substation identities in unused fields of physical layer operation and maintenance parts, which are a predefined part of one of the downstream information packets and which are broadcasted anyway on a predefined regular base the number of bits of the overhead of one information packet is a reduced number of bits. This method is a time slot management method for use in a time division multiple access network which includes a main station coupled to each of a plurality of substations via the cascade connection of a common transmission link and an individual user link, the management method including broadcasting substation identities in downstream information packets from the main station to the plurality of substations to allow each one of the plurality of substations upon detection of its own substation identity to transfer a predetermined amount of upstream information packets in predetermined upstream timeslots to the main station, wherein the time slot management method additionally includes embedding at least part of the substation identities in a physical layer operation and maintenance part, the physical layer operation and maintenance part being a predefined part of one of the downstream information packets broadcasted from the main station to the plurality of substations to transport operation and maintenance information packets related to operation and maintenance functions.

In addition, the present invention is directed to a main station for inclusion in a time division multiple access network wherein the main station is to be coupled to each of a plurality of substations via the cascade connection of a common transmission link and an individual user link, the main station including a packet formatting module to insert substation identities in downstream information packets in order to broadcast the information packets from the main station to the plurality of substations to thereby allow each one of the plurality of substations upon detection of its own substation identity to transfer a predetermined amount of upstream information packets in predetermined upstream timeslots to the main station, wherein the main station includes inserting means to insert at least part of the substation identities in a physical layer operation and maintenance cell, the physical layers in one of the downstream information packets broadcasted from the main station to the plurality of substations to transport operation and maintenance information packets related to operation and maintenance functions.

Furthermore, the present invention is directed to a substation for inclusion in a time division multiple access network, the time division multiple access network including a main station being coupled to each of a plurality of substations including the substation via the cascade connection of a common transmission link and an individual user link, substation identities of the plurality of substations being broadcasted in downstream information packets from the main station to the substations in order to allow each one of the plurality of substations upon detection of its own substation identity to transfer a predetermined amount of upstream information packets in predetermined upstream timeslots to the main station, wherein the substation includes detecting means to detect in a physical layer operation and maintenance cell its own substation identity inserted by the main station in the physical layer operation and maintenance cell, the physical layer operation and maintenance cell being a predefined part included in one of the downstream information packets broadcasted from the main station to the plurality of substations to transport operation and maintenance information packets related to operation and maintenance functions.

It has to be remarked that operation and maintenance functions for e.g. an Asynchronous Transfer Mode layered model are described in e.g. the book *Asynchronous Transfer Mode: Solution for Broadband ISDN* written by Martin de Prycker, and more particular in Chapter 3: Description of ATM according to CCITT from page 97 to page 124, published in 1991 by Ellis Horwood Limited, ISBN 0-13-053513-3.

Also the scope of the Recommandation ITU-TI.610, March /1993, previously CCITT Recommandation described in paragraph 1.2, page 1 thereof, is to identify the minimum set of functions required to operate and maintain the Physical Layer and Asyncronous Transfer Mode ATM Layer aspects of the Broadband Integrated Services Digital Network B-ISDN user network interface. Five phases are considered in specifying the operation and maintenance OAM functions of the Broadband—Integrated Services Digital Network B-ISDN which are described in more detail on page 1 and 2 of this ITU Recommandation and which are listed hereafter:

Performance monitoring;

Defect and failure detection;

System protection;

Failure or performance information;

Fault localization.

Common operation and maintenance OAM cell fields for point-to-point conncetions are described in paragraph 7, ATM Layer OAM Cell Format, pages 17–18 of this ITU-TI.610 Recommandation and the specific fields for each type of OAM cells are described in paragraph 7.2 Specific Fields for Fault Management Cell, pages 78 to 21 of this recommendation. As it can be seen from the description of these fields the OAM cell indeed includes unused Operation and Maintenance cell information fields. By inserting, following the invention, in a format similar to such above format but for point-to-multi-point connections, at least part of the substation identities in unused fields of the operation and maintenance cells less substation identities i.e. less bits are inserted in the overhead of the information packets.

An important advantage of the time slot management method following the invention is that in the event when all substation identities are inserted in physical layer and operation and maintenance parts the time slot management method is more flexible towards an increase of the number of substations. Indeed, with an increase of the number of substations more substation identities are required whereby the number of bits of a substation identity also increases. In the event when e.g. substation identities are distributed over the overhead of downstream information packets, an increase of the word length of the substation identities has an impact on the overhead of the information packets and eventually on the structure of the downstream frame format. However, in the event when all substation identities are inserted in physical layer and operation and maintenance parts, an increase of the word length of the substation identities has only an impact on the organization of the fields of the physical layer and operation and maintenance parts.

It has to be remarked that the downstream information packets and the upstream information packets may be carried as e.g. a continuous stream of cells in a cell based format with a cell based physical layer. Physical layer operation and maintenance cells are used for the conveyance of the physical layer operation and maintenance information and are inserted in the continuous stream of information packets with a predefined insertion rate. Embedding at least part of the substation identities in such physical layer operation and maintenance cells, shortly PLOAM cells, is a possible implementation of the method of the invention.

It has to be remarked that a substation identity is not necessarily a manufacturing number assigned during manufacturing following a predefined unique and programmed manufacturing serial number. It can also be a ranging grant which is used during a ranging process whereby this ranging grant is generated by a main station in order to initiate the ranging process. Two conditions for a substation to react on such a ranging grant is that the substation has not yet received an identification number from the main station and that its manufacturing serial number matches a mask given by the central station. If both conditions are valid the substation is allowed to react on such a ranging grant. A feature of the method according to the present invention is that a substation identity embedded in a physical layer operation and maintenance cell is a ranging grant.

Once a substation has received an identification number from the main station and the ranging process is completed, the substation is allowed to react on a data grant from the main station which includes his identification number and is allowed to send data to the main station.

A time slot management method following the invention can be used in an optical communication network.

Yet an important advantage of the management method following the invention becomes clear in the event when a downstream information packet is an asynchronous transfer mode cell, i.e. an ATM cell, and in the event when all substation identities are embedded in physical layer operation and maintenance cells and no total overhead is required. Indeed, for such a format the downstream frame format of the downstream information packets lines up with the requirements of the International Telecommunication Union ITU-T Recommendation I.432, March /1993, Integrated Services Digital Network ISDN User Network Interfaces/Broadband Integrated services Digital Network B-ISDN User Network Interface—Physical Layer Specification. This standard describes more in detail on page 8 the interface structure of the physical layer for a cell based interface consisting of a continuous stream of ATM cells, each containing 53 octets and with a maximum spacing between successive physical layer cells of 26 ATM layer cells. Such a physical layer cell can either be an idle cell or a physical layer operation and maintenance cell depending on the operation and maintenance requirements. A time slot management method following the invention can have at least one downstream information organized as an asynchronous transfer mode cell ATM.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
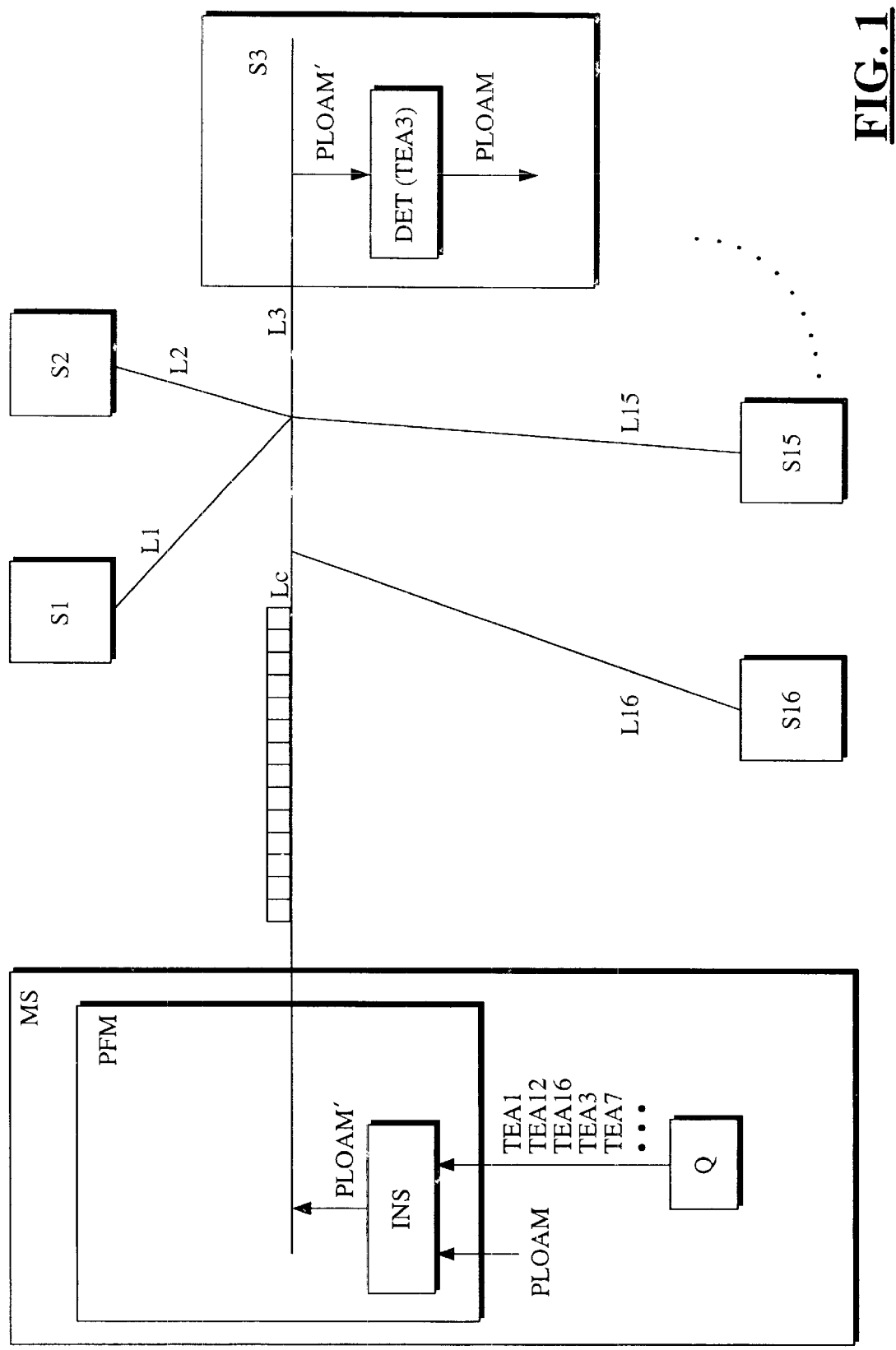
FIG. 1 shows a block scheme of an embodiment of a time division multiple access network wherein the method of the invention is used.

Referring to FIG. 1 a time slot management method used in a time division multiple access network will be described.

First, the working of the time division multiple access network will be explained by means of a functional description of the blocks shown in FIG. 1. Based on this description, implementation of the functional blocks in FIG. 1 will be obvious to a person skilled in the art and will therefor not be described in detail. In addition, the principle working of the time slot management method following the invention will be described in further detail.

The time division multiple access network includes a main station MS and a plurality of substations S1, S2, S3, . . . , S15, S16. The main station MS is coupled to each substation S1, S2, S3, . . . , S15, S16 via the cascade connection of a common transmission link Lc and an individual user link L1, L2, L3, . . . , L15, L16.

The time division multiple access network is an optical network transporting asynchronous transfer mode ATM cells over optical fibers from the main station MS to the substations S1, S2, S3, . . . , S15, S16. The goal is to have a network which is transparent for ATM cells and which has an optimized throughput with minimal constraints on the optical components. Optical passive splitters which are not shown in the figure in order not to overload the figure are used in order to reach the substations S1, S2, S3, . . . , S15, S16.

The time division multiple access network broadcasts substation identities TEA1, TEA12, TEA16, TEA3, TEA7, . . . in downstream information packets form the mains station MS to the plurality of substations S1, S2, S3, . . . , S15, S16. Upon detection of its own identity a substation is allowed to transfer a predetermined amount of upstream information packets in predetermined upstream timeslots to the main station MS. For example: upon detection of substation S3 of its own identity TEA3, substation S3 is allowed to send to the main station upstream information packets in predetermined timeslots.

The main station MS includes a packet formatting module PFM, inserting means INS and queuing means Q. The queuing means Q is coupled to the inserting means INS which is included following this embodiment in the packet formatting module PFM.

Each substation, whereof only substation S3 is shown in detail in order not to overload the figure, includes detecting means DET.

The functions of each functional block of above will be described in the following paragraphs.

The time slot management network allocates the time slots in a flexible and dynamically way. Indeed the upstream transfer capacity of the time division multiple access network is shared amongst the substations S1, S2, S3, . . . , S15, S16 based on their needed and requested upstream bandwidth to transmit upstream information. This needed upstream bandwidth is requested by the substations S1, S2, S3, . . . , S15, S16 to the main station MS. The requested bandwidth is translated by the main station MS in a predetermined number of allocated timeslots. This is realized by creating according the requested bandwidth of the substations S1, S2, S3, . . . , S15, S16 a stream of transmit enable addresses which are called in this application substation identities TEA1, TEA12, TEA16, TEA3, TEA7, . . . . It has to be remarked that the detailed working of this allocation is described in the cited patent application but goes beyond the scope of this invention. The aim is the use of the stream of substation identities TEA1, TEA12, TEA16, TEA3, TEA7, . . . to inform the substations S1, S2, S3, . . . , S15, S16 of the allocated timeslots. Following this embodiment the stream of substation identities TEA1, TEA12, TEA16, TEA3, TEA7, . . . is provided to the inserting means INS by the queuing means Q.

Physical layer operation and maintenance cells, shortly PLOAM cells, are also provided to the inserting means INS. Besides another important function which is described in a following paragraph, the inserting means INS inserts the PLOAM cells in the downstream information packets. This means that such a PLOAM cell is in fact a predefined part included in one of the downstream information packets.

The content and the functions of such a PLOAM cell is described in the introductory part of this application. In order to support the downstream capacity provided at the main station MS and transmitted from the main station MS to the substations S1, S2, S3, . . . , S15, S16 it is desirable to insert a minimum number of PLOAM cells. Indeed, in this way a minimum overhead is added. However, in order to make the interface of the network of this embodiment compliant to the ITU-T Recommandation I.432 the maximum spacing between successive physical layer cells is 26 ATM layer cells i.e. after 26 continuous ATM layer cells have been transmitted from the main station MS to the substations S1, S2, S3, . . . , S15, S16 a physical layer cell is inserted by the packet formatting module PFM in the downstream information packets in order to adapt the transfer capability to the interface rate.

Figure 2:
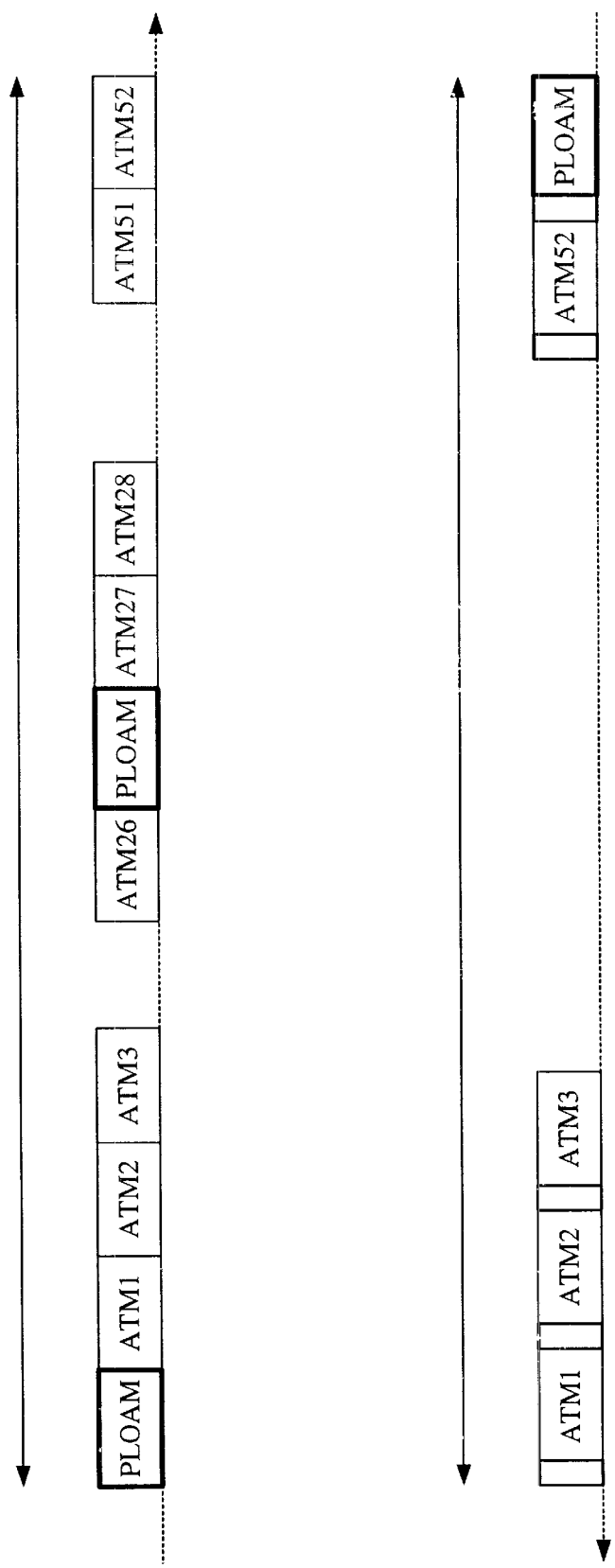
FIG. 2 shows a downstream frame format and an upstream frame format used by the time division multiple access network of FIG. 1.

Referring to FIG. 2 the downstream frame format and the upstream frame format used by the time division multiple access network of FIG. 1 is shown. As it can be seen on FIG. 2, after 26 ATM cells a PLOAM cell is inserted.

The time slot management method of the invention is introduced thereafter i.e. inserting at least part of the substation identities TEA1, TEA12, TEA16, TEA3, TEA7, . . . in the PLOAM cells. This function is realized by the inserting means INS. In the described preferred embodiment all substation identities TEA1, TEA12, TEA16, TEA3, TEA7, . . . are inserted in the PLOAM cells. In this way the requirements of the ITU-T Recommendation I.432 are still supported and the overhead of a downstream information packet becomes superfluous.

This preferred embodiment also ensures that the boundaries of the downstream frame format are in accordance with the boundaries of the upstream format. In this way it is easier to calculate the delay ranging, i.e. the time needed for an information packet to travel from the main station MS to a particular substation e.g. substation S3 and back to the main station MS. By this way a symmetrical interface is realized and no stuffing bytes have to be inserted in order to align the downstream bitrate with the upstream bitrate. The accordance of the boundaries can be seen on FIG. 2.

It has to be remarked that by choosing the number of upstream cells in an upstream frame format as a multiple of the number of bytes of a downstream cell, which is 53 bytes for one ATM cell the boundaries of the frames are aligned and the lookout of the upstream and downstream frame format can easily be determined. A direct relation between the number of downstream cells in a downstream frame format and the number of overhead bytes of one upstream cell is established. This means that for any length of an overhead of an upstream cell the number of downstream cells is a whole number. The above assumptions and relations are given by the following formulae's whereby:

d: number of downstream cells in a downstream frame format;

$C_d$: number of bytes of a downstream cell;

$H_d$: number of bytes of the overhead of a downstream cell;

u: number of upstream cells in an upstream frame format;

$C_u$: number of bytes of an upstream cell;

$H_u$: number of bytes of the overhead of an upstream cell;

m: multiple of number of upstream cells in an upstream frame format to the number of bytes of a downstream cell which is 53 bytes;

Assumptions:
1. Downstream cell format and upstream cell format are ATM cells whereby→length ATM cell=53 bytes= $C_d=C_u$
2. $H_d=0$
3. u=m * number of bytes of downstream cell=m * 53

Conclusions:

In the event when the number of downstream bytes of the downstream frame equals the number of upstream bytes of an upstream frame:

$$(H_d+C_d)*d=(H_u+C_u)*u \rightarrow$$

$$(0+53)*d=(H_u+53)*m*53 \rightarrow$$

$$d=(H_u+53)*m \rightarrow$$

Since it is simpler to integrate the involved functionality's in the design of an application specific integrated circuit when the frame formats are shorter it is preferred in this embodiment to equalize the number of upstream cells to the number of bytes of a downstream cell:

u=m * number of bytes of downstream cell=m * 53 with m=1

→ u=53 d=$H_u$+53

When an upstream overhead of 1 byte is needed the number of cells of the downstream frame format equals 54 whereby all parameters of the downstream and upstream frame format are defined. In this particular embodiment the number of bytes of the overhead of an upstream cell is indeed chosen to be three.

Since every 26 downstream ATM cells a physical layer cell has to be inserted it can be calculated that 2 cells of the 54 downstream cells have to be a PLOAM cell. FIG. 2 shows 54 ATM structured cells whereof 2 PLOAM cells and 52 ATM information cells.

Since an upstream frame format includes 53 cells and since for each upstream cell a substation identity e.g. TEA3 is required in order to transfer an upstream information packet in an upstream timeslot i.e. such an upstream cell from a substation e.g. S3 to the main station MS, it can also be calculated that in these two PLOAM cells 53 substation identities TEA1, TEA12, TEA16, TEA3, TEA7, ... have to be inserted. Following this embodiment 27 substation identities are inserted in the first PLOAM cell of a downstream frame format and 27 substation identities whereof one idle substation identity are inserted in the second PLOAM cell of a downstream frame format. This is realized by the inserting means INS of the main station MS.

An example of the allocation of operation and maintenance functions is given on page 10 of the above mentioned Recommendation I.432. Since this is a recommendation for point to point connections and a recommendation for point to multipoint connections is not yet available but is expected to be processed in the future, it is also expected to have some reserved fields available to insert substation identities.

Like already mentioned above, a substation e.g. S3 has to detect its own identity in a received PLOAM cell in order to be allowed to transfer an upstream information packet. This is realized by the detecting means DET. In order not to overload FIG. 1 only for substation S3 the detecting means are shown DET(TEA3).

Although the principle working of the invention has become clear by the above description of the functionality's of each functional block included in the mains station MS and the substations S1, S2, S3, ... , S15, S16, the consecutive steps of the method of the invention will be repeated here shortly.

A stream of substation identities TEA1, TEA12, TEA16, TEA3, TEA7, ... and consecutive PLOAM cells are provided to the inserting means INS.

The inserting means INS inserts the first 27 substation identities of this stream whereof the identity of substation S3, i.e. TEA3 at predefined fields in the first coming PLOAM cell. It has to be remarked that in FIG. 1 the PLOAM cell after insertion of the substation identities is shown as PLOAM'. The PLOAM cell is packed by the packet formatting module PFM into the downstream frame format and distributed to the plurality of substations. Substation S3 receives the PLOAM cell which is provided to the detecting means DET(TEA3). The detecting means DET (TEA3) of substation S3 detects its own identity TEA3 in the PLOAM cell and knows that it is allowed to transfer an upstream information packet in a predefined upstream timeslot.

It should be noted that although the above described network of the chosen embodiment is an asynchronous transfer mode ATM network, the application of the present invention is not restricted to the field of ATM. Small modifications, evident to a person skilled in the art may be applied to the above described embodiment to adapt it to be integrated in other time division multiple access networks wherein physical layer operation and maintenance parts are predefined in downstream information packets.

While the principles of the invention have been described above in connection with specific apparatus, it is to be clearly understood that this description is made only by way of example and not as a limitation on the scope of the invention, as defined in the appended claims.

It should further be noticed that the term "including", used in the claims, should not be interpreted as being limitative to the means listed thereafter. Thus, the scope of the express "a device including means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

What is claimed is:

1. A time slot management method for use in a time division multiple access network which includes a main station (MS) coupled to each of a plurality of substations (S1, S2, S3, ... , S15, S16) via the cascade connection of a common transmission link (Lc) and an individual user link (L1, L2, L3, ... , L15, L16), said management method including broadcasting substation identities (TEA1, TEA12, TEA16, TEA3, TEA7, ... ) in downstream information packets from said main station (MS) to said plurality of substations (S1, S2, S3, ... , S15, S16) to allow each one of said plurality of substations (S1, S2, S3, ... , S15, S16) upon detection of its own substation identity to transfer a predetermined amount of upstream information packets in predetermined upstream timeslots to said main station (MS), characterized in that said time slot management method additionally includes embedding at least part of said substation identities (TEA12, TEA3, TEA7, . . . ) in a physical layer operation and maintenance part (PLOAM), said physical layer operation and maintenance part being a predefined part of one of said downstream information packets broadcasted from said main station (MS) to said plurality of substations (S1, S2, S3, . . . , S15, S16) to transport operation and maintenance information packets related to operation and maintenance functions, wherein said substation identities are transmit enable addresses.

2. The time slot management method according to claim 1, characterized in that at least one of said substation identities (TEA1, TEA12, TEA16, TEA3, TEA7, . . . ) which are embedded in said physical layer operation and maintenance part (PLOAM) is a ranging grant.

3. The time slot management method according to claim 1, characterized in that at least one of said substation identities (TEA1, TEA12, TEA16, TEA3, TEA7, . . . ) which are embedded in said physical layer operation and maintenance parts (PLOAM) is a data grant.

4. The time slot management method according to claim 1, characterized in that said time slot management method is used in an optical communication network.

5. The time slot management method according to claim 1, characterized in that at least one of said downstream information packets includes at least one asynchronous transfer mode cell (ATM).

6. A main station (MS) for inclusion in a time division multiple access network wherein said main station (MS) is to be coupled to each of a plurality of substations (S1, S2, S3, . . . , S15, S16) via the cascade connection of a common transmission link (Lc) and an individual user link (L1, L2, L3, . . . , L15, L16), said main station (MS) including a packet formatting module (PFM) to insert substation identities (TEA1, TEA12, TEA16, TEA3, TEA7, . . . ) in downstream information packets in order to broadcast said information packets from said main station (MS) to said plurality of substations (S1, S2, S3, . . . , S15, S16) to thereby allow each one of said plurality of substations (S1, S2, S3, . . . , S15, S16) upon detection of its own substation identity to transfer a predetermined amount of upstream information packets in predetermined upstream timeslots to said main station (MS), characterized in that said main station (MS) includes inserting means (INS) to insert at least part of said substation identities (TEA12, TEA3, TEA7, . . . ) in a physical layer operation and maintenance cell (PLOAM), said physical layer operation and maintenance call (PLOAM) being a predefined part included in one of said downstream information packets broadcasted from said main station (MS) to said plurality of substations (S1, S2, S3, . . . , S15, S16) to transport operation and maintenance information packets related to operation and maintenance functions, wherein said substation identities are transmit enable addresses.

7. A substation (S3) for inclusion in a time division multiple access network, said time division multiple access network including a main station (MS) being coupled to each of a plurality of substations (S1, S2, S3, . . . , S15, S16) including said substation (S3) via the cascade connection of a common transmission link (Lc) and an individual user link (L1, L2, L3, . . . , L15, L16), substation identities (TEA1, TEA12, TEA16, TEA3, TEA7, . . . ) of said plurality of substations being broadcasted in downstream information packets from said main station (MS) to said substations (S1, . . . , S16) in order to allow each one of said plurality of substations (S1, S2, S3, . . . , S15, S16) upon detection of its own substation identity to transfer a predetermined amount of upstream information packets in predetermined upstream timeslots to said main station (MS), characterized in that said substation (S3) includes detecting means (DET) to detect in a physical layer operation and maintenance cell (PLOAM ) its own substation identity (TEA3) inserted by said main station (MS) in said physical layer operation and maintenance cell (PLOAM), said physical layer operation and maintenance cell (PLOAM) being a predefined part included in one of said downstream information packets broadcasted from said main station (MS) to said plurality of substations (S1, S2, S3, . . . , S15, S16) to transport operation and maintenance information packets related to operation and maintenance functions, wherein said substation identities are transmit enable addresses.

8. A time slot management method for use in a time division multiple access network which includes a main station (MS) coupled to each of a plurality of substations (S1, S2, S3, . . . , S15, S16) via the cascade connection of a common transmission link (Lc) and an individual user link (L1, L2, L3, . . . , L15, L16), said management method including broadcasting substation identities (TEA1, TEA12, TEA16, TEA3, TEA7, . . . ) in downstream information packets from said main station (MS) to said plurality of substations (S1, S2, S3, . . . , S15, S16) to allow each one of said plurality of substations (S1, S2, S3, . . . , S15, S16) upon detection of its own substation identity to transfer a predetermined amount of upstream information packets in predetermined upstream timeslots to said main station (MS), characterized in that said time slot management method additionally includes embedding at least part of said substation identities (TEA12, TEA3, TEA7, . . . ) in a physical layer operation and maintenance part (PLOAM) instead of being distributed over header parts of said downstream information packets, said physical layer operation and maintenance part being a predefined part of one of said downstream information packets broadcasted from said main station (MS) to said plurality of substations (S1, S2, S3, . . . , S15, S16) to transport operation and maintenance information packets related to operation and maintenance functions, wherein said substation identities are transmit enable addresses.

* * * * *